(12) United States Patent
Dhanjal

(10) Patent No.: US 7,870,990 B2
(45) Date of Patent: Jan. 18, 2011

(54) CLEANING A HOT SOLDERING IRON TIP USING DRY MELAMINE SPONGE

(76) Inventor: Sukhvinder Singh Dhanjal, 2620 Credit Valley Road, Mississauga, Ontario (CA) L5M 4J7

( * ) Notice: Subject to any disclaimer, the term of this patent is extended or adjusted under 35 U.S.C. 154(b) by 786 days.

(21) Appl. No.: 11/117,285

(22) Filed: Apr. 29, 2005

(65) Prior Publication Data

US 2006/0243777 A1    Nov. 2, 2006

(51) Int. Cl.
*B32K 3/06* (2006.01)
(52) U.S. Cl. .................. 228/51; 15/220.4; 15/218.1; 15/104.001; 15/244.1; 428/315.5; 428/131
(58) Field of Classification Search ............. 228/51
See application file for complete search history.

(56) References Cited

U.S. PATENT DOCUMENTS

| | | | |
|---|---|---|---|
| 3,765,047 A | 10/1973 | Tashjian | |
| 3,948,678 A * | 4/1976 | Dezzani | 134/6 |
| 3,990,623 A | 11/1976 | Fortune | |
| 4,118,821 A | 10/1978 | Kuhn | |
| 4,394,785 A | 7/1983 | Vogler | |
| 4,625,355 A | 12/1986 | Miyashita | |
| 4,662,022 A | 5/1987 | Vogler | |
| 4,803,748 A | 2/1989 | Quasney et al. | |
| 6,503,615 B1 | 1/2003 | Horii et al. | |
| 6,604,255 B2 | 8/2003 | Hayashi | |
| 6,608,118 B2 | 8/2003 | Kosaka et al. | |
| 2002/0163105 A1 | 11/2002 | Kosaka et al. | |
| 2005/0136238 A1 | 6/2005 | Lindsay et al. | |
| 2005/0136772 A1 | 6/2005 | Chen et al. | |

FOREIGN PATENT DOCUMENTS

| | | |
|---|---|---|
| DE | 4429873 | 3/1995 |
| DE | 19727181 | 7/1998 |
| EP | 0017672 B1 | 10/1980 |
| GB | 1443024 | 7/1976 |
| GB | 2052958 | 7/1980 |
| GB | 2052958 | 2/1981 |
| JP | 58199658 | 11/1983 |

(Continued)

OTHER PUBLICATIONS

Housewares America, Inc.—Debbie Meyer's—E-Z Kleen'r, on internet at least as early as Mar. 2, 2004.

(Continued)

*Primary Examiner*—Jessica L Ward
*Assistant Examiner*—Nicholas P D'Aniello
(74) *Attorney, Agent, or Firm*—Fitch, Even, Tabin & Flannery

(57) ABSTRACT

In one aspect the invention provides a method of cleaning molten solder from the hot tip of a soldering iron that does not require a water-laden sponge. The hot tip of the iron is wiped against a block of dry open-celled melamine foam. The block is formed with an inclined through-hole that leads to the bottom of a receptacle holding the block. The hot tip is wiped against the foam surrounding an upper end of the through-hole, and the molten solder removed from the tip accumulates in the receptacle below.

3 Claims, 4 Drawing Sheets

FOREIGN PATENT DOCUMENTS

| | | | |
|---|---|---|---|
| JP | 60133972 | | 7/1985 |
| JP | 61099572 | | 5/1986 |
| JP | 61115669 | | 6/1986 |
| JP | 62244573 | | 10/1987 |
| JP | 3174973 | | 7/1991 |
| JP | 8192264 | | 7/1996 |
| JP | 2000317628 | | 11/2000 |
| JP | 2000334405 | | 12/2000 |
| JP | 2001179189 | | 4/2001 |
| JP | 2002059443 | | 2/2002 |
| JP | 2003160687 | | 6/2003 |
| JP | 2003191257 | | 7/2003 |
| JP | 2004174597 | | 6/2004 |
| JP | 2004-202149 | * | 7/2004 |
| JP | 2004344920 | | 12/2004 |
| WO | PCT/US2004/022162 | | 7/2004 |
| WO | WO2005/006284 A2 | | 1/2005 |
| ZA | 8200007 | | 11/1982 |

OTHER PUBLICATIONS

Cleaenpro—on internet at least as early as Mar. 2, 2004.
Advanced Quality Janitorial, Inc., —Wonder Pad, on internet at least as early as Jul. 17, 2005.
Milonix Corp.—Magic Clean Sponge, on internet at least as early as Jul. 17, 2005.
Miracle clean: dirt & grime "magic eraser", on internet at least as early as Jul. 17, 2005.
The Noise Control Centre—Melatech Melamine Foam.
The Noise Control Centre—Basotech Melamine Foam.
Mr. Clean Magic Eraser—as seen on internet at least as early as Jul. 17, 2005.
Xtreme Sponge, on internet at least as early as Jul. 17, 2005.
Weller Soldering station, on internet at least as early as Jul. 17, 2005.
Micro-Tools.Com—Antex, Stand For Miniature Irons on internet at least as early as Jul. 17, 2005.
Action Electronics—Solder Tip Care.
University of Pennsylvania—Help on Soldering—on internet at least as early as Jul. 17, 2005.
Radio Shack—Soldering Iron Holder and Cleaner-on internet at least as early as Jul. 17, 2005.
Craftsman Soldering Iron Holder and Cleaner 54027—Epinions. com, on internet at least as early as Jul. 17, 2005.
Cooper Tools—Weller Dleen-Tip Sponge and tray.
Media College—Cleaning your soldering iron, on internet at least as early as Jul. 17, 2005.
Stellar Technical Products—sponge and tray and tip scrubber, on internet at least as early as Jul. 18, 2005.
Circuit-Test Electronics—Soldering Iron Tip Clerner with Stand, on internet at least as early as Jul. 18, 2005.
Apogeekitis—Soldering Iron tip cleaner tool, on internet at least as early as Aug. 24, 2005.
Miscellaneous soldering iron holders and sponges showing use of wet type sponge for cleaning soldering tips.

* cited by examiner

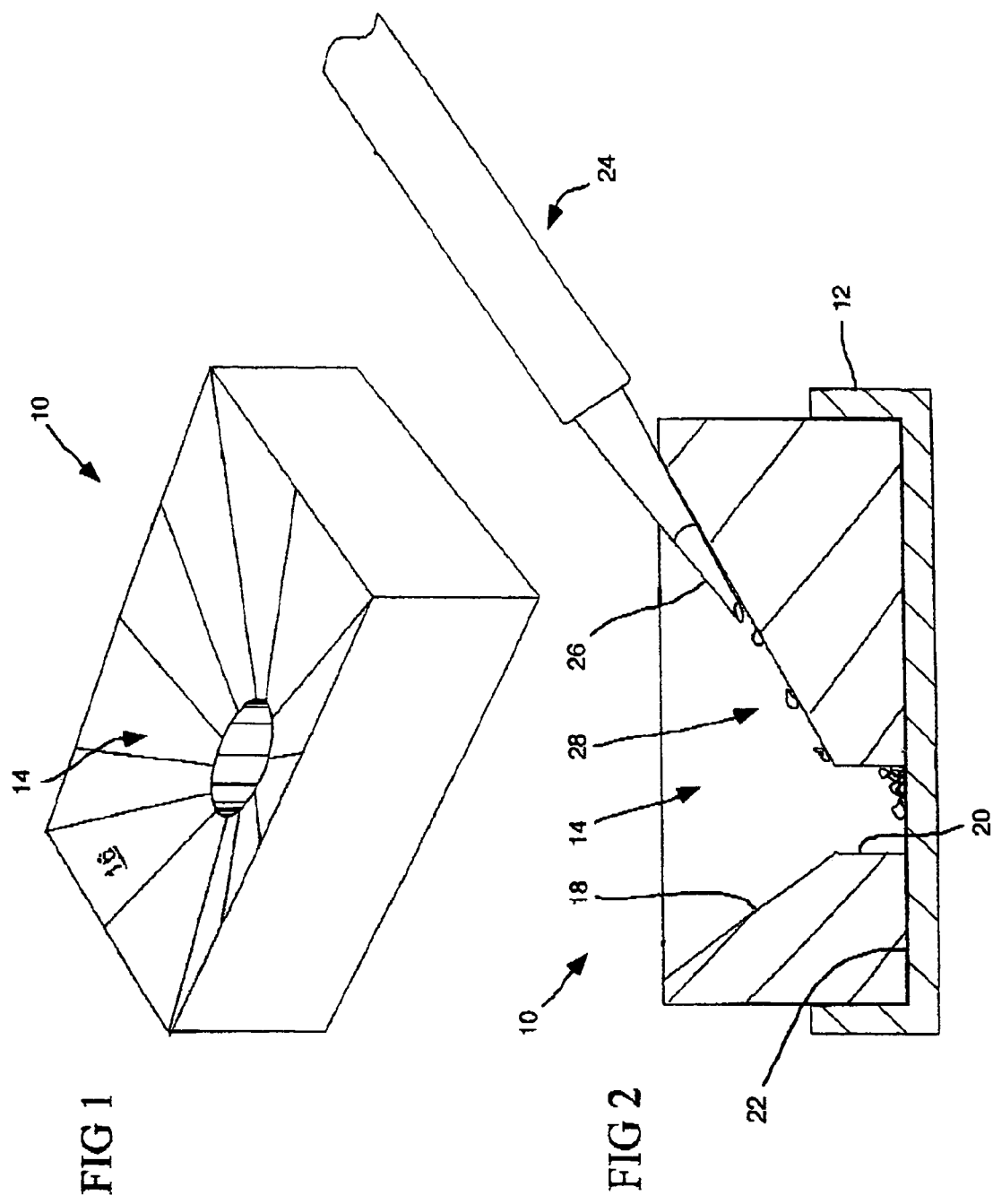

CLEANING A HOT SOLDERING IRON TIP USING DRY MELAMINE SPONGE

FIELD OF THE INVENTION

The invention relates to methods and apparatus for cleaning the hot tip of a soldering iron that do not involve use of water.

DESCRIPTION OF THE PRIOR ART

A soldering iron used to make an electrical or electronic circuit must be cleaned frequently during use. The object is to remove excess molten solder from the tip of the iron and also solder that has become contaminated with burnt residual flux and other materials that impair soldering. Current practice is to wipe the hot tip of the iron against a cellulose sponge soaked with water to avoid burning of the sponge.

Various devices have been proposed in the prior art to implement such a wet cleaning method. A wide-spread practise is to incorporate the sponge into a soldering iron stand. The stand includes a base, a soldering iron holder mounted to the base, and a receptacle in the base for receiving a sponge and water. Other implementations may be found in U.S. Pat. No. 3,990,623 to Fortune; U.S. Pat. No. 4,118,821 to Kuhn; and U.S. Pat. No. 4,803,748 to Quasney.

Other arrangements have been proposed that involve holding the tip of an iron held against dry rotating wiping elements. Examples are to be found in U.S. Pat. No. 3,765,047 to Tashjian; U.S. Pat. No. 4,394,785 to Vogler; and U.S. Pat. No. 4,625,355 to Miyashita. Similar methods and apparatus have also been proposed in Japanese patent JP8192264 to Mizuta et al published on Jul. 30, 1996; German patent DE 4429873 to Kroes published on Mar. 16, 1995; and German patent DE19727181 published on Jul. 2, 1998.

There are significant shortcomings to using a wet sponge to wipe the hot tip of a soldering iron. The principal problem is that the tip cools quickly upon contact with the water-laden sponge. This tends to solidify the molten solder remaining on the tip, and requires the user to wait while the tip to reheats before wiping again. This process may be repeated several times before all solder is removed. Once the tip is clean, the user must wait until the tip is restored to an operating temperature before continuing soldering.

The prior art cleaning method also tends to damage the tip of the soldering iron, impairing application of solder. More specifically, acid residues from solder tend to corrode the tip. As well, use of water in wiping sponges is conducive to build up of salts, especially in areas where local water has a high mineral content. In short order the tip must be replaced.

Despite such shortcomings, the practice of placing a pad of water-laden sponge into a receptacle and wiping the hot tip of a soldering iron against the pad continues.

SUMMARY OF THE INVENTION

In one aspect, the invention provides a method of cleaning molten solder from the hot tip of a soldering iron without use of water. The method involves wiping the hot tip against a dry block of open-celled melamine foam. Such sponge material has been used for household cleaning as it is durable and mildly abrasive. The tip of a soldering iron may typically achieve a temperature of about 450 degrees centigrade, and melamine foam, which has a melting point of about 350 degrees centigrade, can adequately withstand the higher temperature during the brief contact required in normal wiping. Significantly, melamine foam also has the characteristic of becoming more rigid upon application of heat. This is ideal for soldering applications since repeated exposure to a hot iron tends to impart structural rigidity to the surface of the foam, keeping it from falling apart.

A major advantage of using melamine foam is that cleaning time is significantly reduced. Since the tip is not exposed to water, which has a high thermal capacity, the user is not obliged to wait repeatedly for the tip to reheat in order to complete wiping. As well, the user does not have to wait a significant period of time for the tip to restore to an operating temperature before resuming soldering operations.

Another significant advantage of the invention is very effective cleaning. The microcell construction of melamine results in a mildly abrasive cleaning action that removes flux residues very effectively. With prior art methods, fumes potentially hazardous to the user may be seen rising from the tip of the iron, which suggests that contaminants have not be entirely removed. The cleaning method of the invention is sufficiently effective that virtually no noticeable fumes are produced. Since melamine foam is largely free of halides, fibre and CFC's, the foam is also less likely to release toxic substances in response to heat from a soldering iron, particularly since wiping action involves only short contact between iron and foam.

Another advantage of the invention is that the life of the soldering iron tip is extended. One factor is that the method provides very effective removal of acid residues. Another is that the hot tip is not exposed to water so there is no consequent build-up of salts. Since corrosion is reduced, the tip need not be replaced as frequently.

Another advantage of the invention relates to disposal of spent solder that accumulates after repeated cleaning of a soldering iron tip. In the prior art, there has been a tendency to dispose of spent solder beads in a conventional drain, which introduces lead and other toxic materials into local water. Since the method of the invention does not involve a water-laden sponge, there is no need to separate spent solder from water, and users can very conveniently deposit the solder in dry disposal containers.

Other aspects of the invention, including apparatus for implementing the methods of the invention, will be apparent from a description below of a preferred embodiment, and will be more specifically defined in the appended claims. This specification refers to a "through-hole" formed, for example, in a block of melamine foam. For certainty of interpretation, a "through-hole" should be understood as an open-ended passage extending fully between two spaced-apart surfaces.

BRIEF DESCRIPTION OF THE DRAWINGS

The invention will be better understood with reference to drawings illustrating a preferred embodiment, in which:

FIG. 1 is a perspective view of a block of melamine adapted for cleaning of a soldering iron tip;

FIG. 2 is a vertical cross-section of the block of foam of FIG. 1 and a receptacle that retains the block of the foam;

DESCRIPTION OF PREFERRED EMBODIMENT

Figure 3:
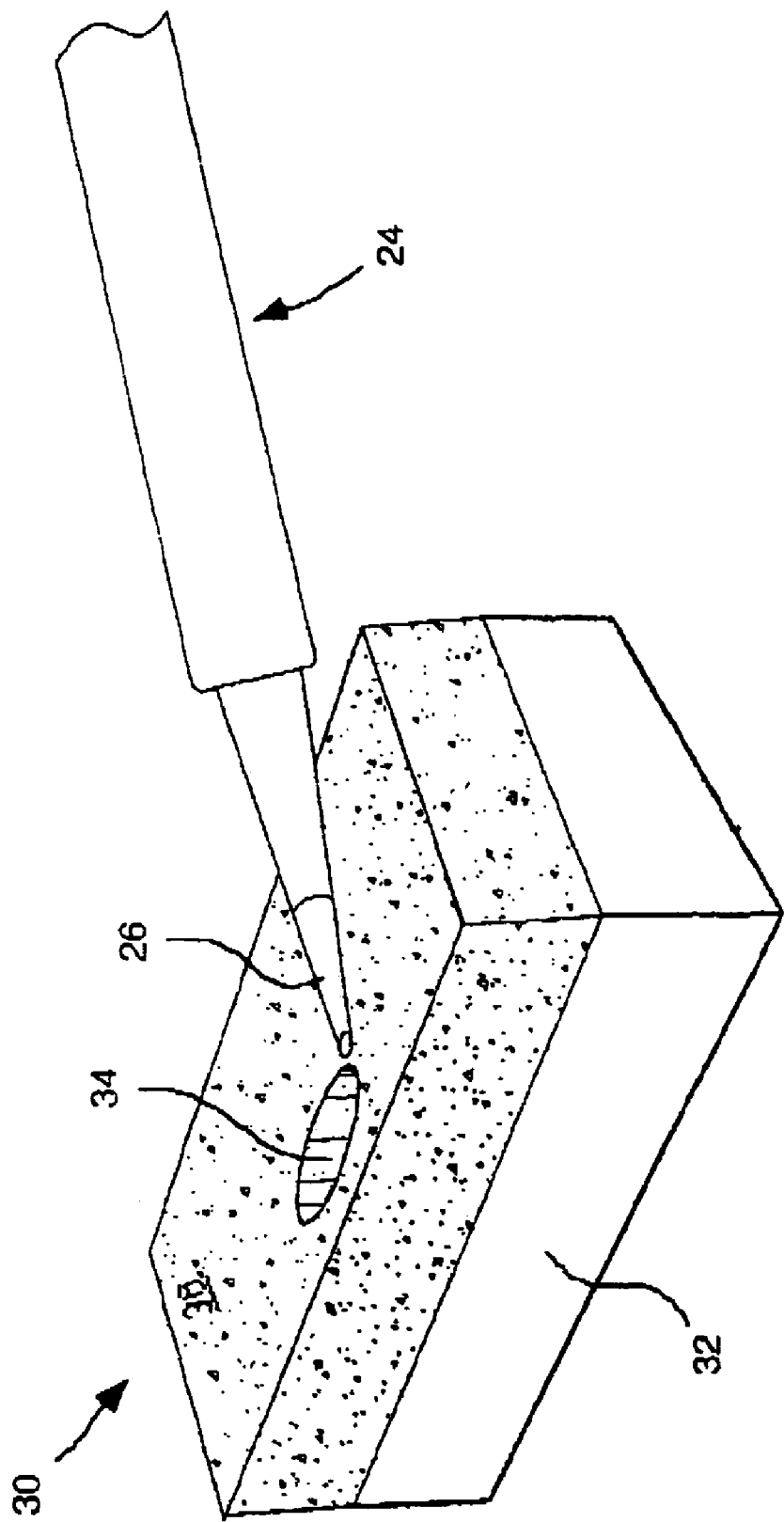
FIG. 3 is a perspective view of another block of melamine foam and a receptacle adapted for cleaning of a soldering iron tip.

Reference is made to FIG. 1 and 2 which show a generally rectangular block 10 of dry open-celled melamine foam and a receptacle 12 shaped to retain a lower portion of the block 10. The block 10 of foam has a funnel-shaped recess 14 in its top surface 16. The recess 14 has a conical upper portion 18 and a cylindrical lower portion 20 that extends fully to the bottom surface 22 of the block 10. As apparent in FIG. 2, a soldering iron 24 is cleaned by wiping the hot tip 26 of the iron 24 against the inclined surfaces of the conical portion 18 of the recess 14. Molten beads 28 of solder travel along the inclined surfaces of the conical portion 18 into the cylindrical portion 20 of the recess 14, accumulating at the bottom of the receptacle 12. When soldering is done, the user can simply invert the block 10 and the receptacle 12 over a dry waste container (not shown) to remove accumulated solder 28.

FIG. 3 shows alternative apparatus for cleaning the soldering iron tip 26. Once again, the apparatus includes a generally rectangular block 30 of dry open-celled melamine foam, and a generally rectangular receptacle 32 shaped to receive a lower portion of the block 30. A cylindrical through-hole 34 with an oval cross-section extends vertically through the block 30 of foam. The user has the option of wiping the tip 26 of the soldering iron 24 along the top surface 36 of the block 30 of foam. Alternatively, the user can insert the tip 26 partially into the through-hole 34, and then wipe the tip 26 against the upper edge of the through-hole 34 or against the foam surrounding the upper end of the through-hole 34.

Figure 4:
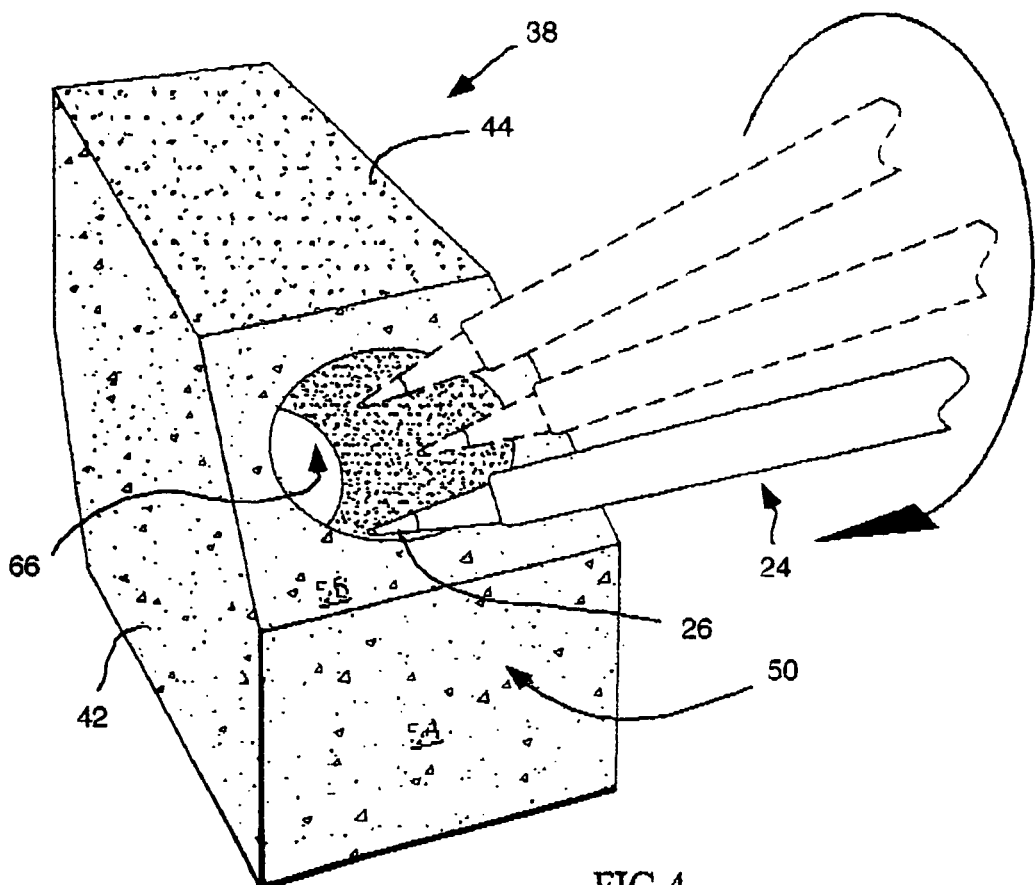
FIG. 4 is a perspective view of yet another block of melamine foam adapted for cleaning of a soldering iron tip.
Figure 5:
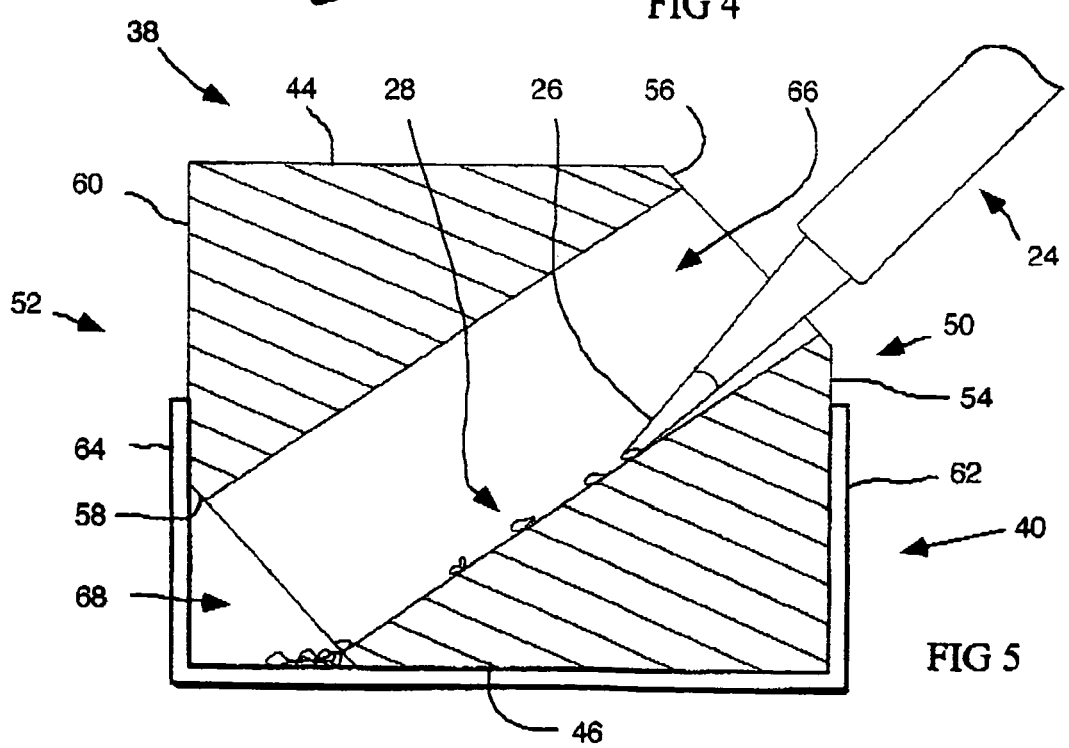
FIG. 5 is a vertical cross-section of the block of melamine foam of FIG. 4 and a receptacle that retains the block of the foam; and, FIG. 6 is a vertical cross-section of the block of melamine foam and a receptacle which are a variant of the apparatus of FIG. 5.

FIGS. 4 and 5 illustrate yet another apparatus for cleaning the tip 26 of the soldering iron 24, a strongly preferred implementation of such cleaning apparatus. Once again, the apparatus includes a block 38 of dry open-celled melamine foam, and a generally rectangular receptacle 40 for receiving a lower portion of the block 38.

The block 38 has an overall rectangular shape with a pair of diagonally opposing corners beveled. The block 38 has a parallel pair of opposing side faces 42 (only on side face apparent) that are planar and vertical. The block 38 also has parallel top and bottom surfaces 44, 46 that are planar and horizontal. The block 38 also has forward and rear faces 50, 52. The forward face 50 has a lower surface 54 that is planar and vertical, and an upper surface 56 that is planar and inclined at an acute angle (roughly 45 degrees) relative to the top surface 44 of the block 38. The rear face 52 has a planar lower surface 58 that is inclined at an acute angle (roughly 45 degrees) relative to the bottom surface 46 of the block 38 and a planar upper surface 60 that is vertical. The lower surface 54 of the forward face 50 and the upper lower of the rear face 52 and are parallel, vertical and spaced for receipt between forward and rear walls 62, 64 of the receptacle 40. A circular through-hole 66 extends between the upper inclined surface of the forward face 50 and the lower inclined surface of the rear face 52. The through-hole 66 is inclined at 45 degrees relative to vertical and has open upper end and an open lower end. This symmetry of this arrangement permits the block 38 of foam to be removed from the receptacle 40, rotated 180 degrees about a central horizontal axis perpendicular to the side faces 42, and then reinstalled in the receptacle 40. When rotated, the orientation of the block 38 is identical to its original orientation shown in FIG. 5. The inclined lower surface 58 of the rear face 52 cooperates with the receptacle 40 to define a space or cavity 68 where solder 28 can accumulate.

In use, the hot tip 26 of the iron 24 is inserted into the upper end of the through-hole 66 and contacted with the foam surrounding the through-hole 66. As indicated in FIG. 4, the user then rotates the tip 26 around the interior surfaces of the through-hole 66 to wipe molten solder from the tip 26. (In FIG. 4, positions of the soldering iron 24 during such rotation have been shown in phantom outline). The molten solder 28 then travels along the inclined through-hole 66, escapes through the lower end of the through-hole 66, and deposits in the space between the receptacle 40 and the inclined lower surface 58 of the rear face 52. Solder does not cling strongly to the melamine foam; however, should solder accumulate near the upper end of the through-hole 66, the block 38 can be rotated through 180 degrees relative to the receptacle 40, and the user can continue soldering and wiping the tip 26 as required. To clean the apparatus, the block 38 of foam is simply removed, and the debris accumulated in the cavity 68 can simply be dumped into a dry disposal container. Any solder clinging to the foam surrounding the through-hole 66 can be dislodged with a finger.

Figure 6:
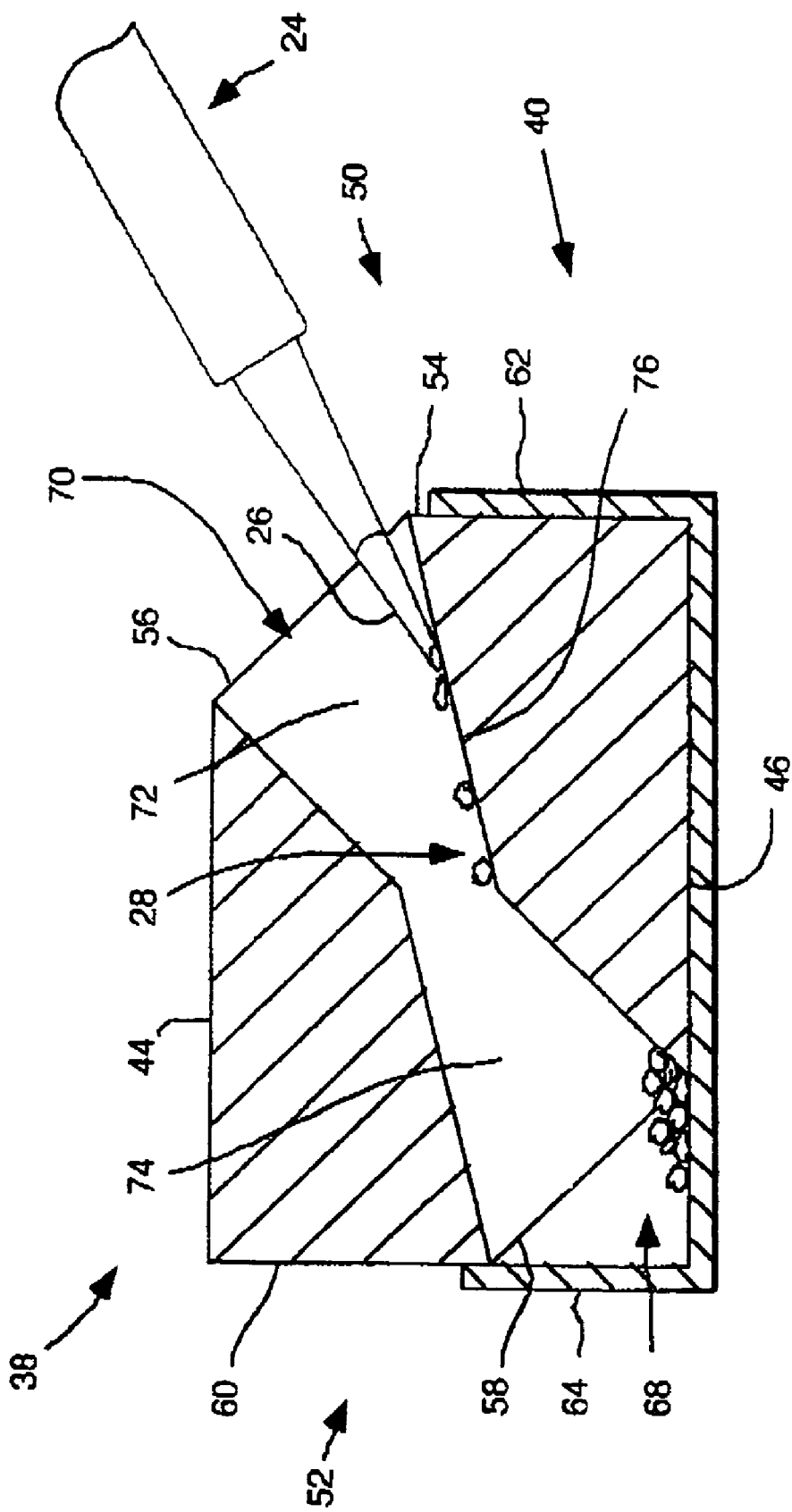

FIG. 6 shows a variation of the apparatus of FIGS. 4 and 5. Common reference numerals have been used to indicate features common to the two apparatus. The principal difference resides in the configuration of the shape of their respective through-holes. The apparatus of FIG. 6 has a through-hole 70 with an upper frustoconical portion 72 and a lower frustoconical portion 74. Each frustoconical portion 72 or 74 expands progressively from the center of the block 38 to the inclined surfaces between which the through-hole 70 extends. This arrangement permits the user to keep the conical tip 26 of the soldering iron 24 substantially normal to the entrance opening of the through-hole 70. More specifically, limited wrist action is required to wipe the conical surface of tip 26 against the conical inner surfaces that define the conical passage portions 72, 74. Beads 28 of solder forming against those surfaces travel along the inclined trough 76 of the upper passage portion 72 and accumulate in the cavity 68.

It will be appreciated that particular embodiments of the invention have been described and that modifications may be made therein without necessarily departing from the scope of the appended claims.

Parts List—Cleaning Soldering Iron Tip

FIGS. 1 and 2
10 block
12 receptacle
14 funnel-shaped recess
16 top surface (block)
18 upper conical portion
20 lower cylindrical portion
22 bottom surface (portion)
24 soldering iron
26 hot tip
28 beads of solder FIG. 3
30 block
32 receptacle
34 through-hole
36 top surface (block)

FIGS. 4 and 5
38 block
40 receptacle
42 side faces
44 top surface
46 bottom surface
48 (not used)
50 forward face
52 rear face
54 lower surface (forward face—vertical)

56 upper surface (forward face—inclined)
58 lower surface (rear face—inclined)
60 upper surface (rear face—vertical:)
62 forward wall (receptacle)
64 rear wall (receptacle)
66 through-hole
68 cavity (accumulating solder)

FIG. 6
70 through-hole
72 upper frustoconical portion (through-hole)
74 lower frustoconical portion (through-hole)
76 trough (through-hole)

The embodiments of an invention in which an exclusive property or privilege is claims are defined as follows:

1. An apparatus for cleaning a molten solder from a hot top of a soldering iron without using water, the apparatus comprising:
   a dry open-celled melamine foam, the foam defining a hole extending from a surface of the dry open-celled melamine foam and configured to engage a soldering iron tip and direct molten solder from the soldering iron tip toward a lower end of the hole when the soldering iron tip engages the dry open-celled melamine foam near an upper end of the hole;
   wherein the hole comprises a through-hole;
   top and bottom surfaces of the foam are flat and parallel;
   a forward face of the foam comprises a lower surface which is flat and vertical and an upper portion which is inwardly inclined from vertical; and
   a rear face of the foam comprises an upper surface which is flat and vertical and a lower portion which is inwardly inclined from vertical;
   wherein the foam is configured to be rotated 180 degrees about a horizontal axis, and usable to engage a soldering tip;
   wherein the through-hole extends from the upper portion of the forward face to lower portion of the rear face of the foam.

2. The apparatus of claim 1 in which the through-hole comprises at least one of a forward frustoconical portion or a rear frustoconical portion, the forward frustoconical portion expands progressively toward the forward face, and the rear frustoconical portion expands progressively toward the rear face.

3. The apparatus of claim 1 further comprising a receptacle shaped to receive a lower portion of the foam and to accumulate any solder escaping from a lower end of the through-hole.

* * * * *